(12) United States Patent
Linder et al.

(10) Patent No.: US 11,892,285 B2
(45) Date of Patent: Feb. 6, 2024

(54) THICKNESS MEASUREMENT USING A PULSED EDDY CURRENT SYSTEM

(71) Applicant: ABB Schweiz AG, Baden (CH)

(72) Inventors: Sten Linder, Trosa (SE); Jarl Sobel, Bagarmossen (SE); Anders Eidenvall, Västerfärnebo (SE); Martin Haldin, Västerås (SE); Aleksander Dzieciol, Uppsala (SE)

(73) Assignee: ABB Schweiz AG, Baden (CH)

( * ) Notice: Subject to any disclaimer, the term of this patent is extended or adjusted under 35 U.S.C. 154(b) by 73 days.

(21) Appl. No.: 17/652,296

(22) Filed: Feb. 24, 2022

(65) Prior Publication Data

US 2022/0282964 A1 Sep. 8, 2022

(30) Foreign Application Priority Data

Mar. 2, 2021 (EP) .................................... 21160295

(51) Int. Cl.
*G01B 7/06* (2006.01)

(52) U.S. Cl.
CPC .................................... *G01B 7/105* (2013.01)

(58) Field of Classification Search
CPC ...... G01B 2210/46; G01B 7/10; G01B 7/105; G01B 1/00; G01B 3/00; G01B 5/00;
(Continued)

(56) References Cited

U.S. PATENT DOCUMENTS 5,059,902 A 10/1991 Linder
6,593,737 B2 7/2003 Crouzen et al.
(Continued)

FOREIGN PATENT DOCUMENTS

| WO | 8802842 A1 | 4/1988 |
|---|---|---|
| WO | 2005064268 A1 | 7/2005 |
| WO | 2008034870 A1 | 3/2008 |

OTHER PUBLICATIONS

Extended European Search Report; Application No. 21160295.8; Completed: Jul. 22, 2021; dated Jul. 29, 2021; 8 Pages.

*Primary Examiner* — Feba Pothen
*Assistant Examiner* — Brent J Andrews
(74) *Attorney, Agent, or Firm* — Whitmyer IP Group LLC

(57) ABSTRACT

A method of non-contact measurement of a thickness (d) of an object of an electrically conductive material by means of a Pulsed Eddy Current, PEC, system including a transmitter coil and a receiver coil. The method includes, after having turned off a current in the transmitter coil, at the receiver coil, measuring a voltage induced by the decaying magnetic field at a first time point, a second time point, and a third time point. The method also includes calculating a total magnetic flux which is generated by the eddy currents in the object at the first time point and picked up by the receiver coil, by comparing the measured flux at the first time point with a predetermined total flux picked up by the receiver coil when no object is present. The method also includes normalizing measured magnetic flux resulting from the eddy currents and picked up by the receiver coil, using the calculated total magnetic flux as a normalization factor such that the normalized eddy current flux is independent of a distance between the object and the transmitter and receiver coils. The method also including, based on the measurements at the first, second and third time points, determining the thickness and the resistivity of the object.

7 Claims, 4 Drawing Sheets

(58) Field of Classification Search
CPC . G01B 7/00; G01B 9/00; G01B 11/00; G01B 13/00; G01B 15/00; G01B 17/00; G01B 21/00; G01B 2210/00; G01B 2290/00
See application file for complete search history.

(56) References Cited

U.S. PATENT DOCUMENTS

| | | |
|---|---|---|
| 6,661,224 B1 * | 12/2003 | Linder ................. G01D 5/2046 324/229 |
| 7,514,918 B2 | 4/2009 | Crouzen |
| 7,701,205 B2 * | 4/2010 | Linder ................... G01R 27/00 324/229 |
| 8,154,277 B2 | 4/2012 | Linder et al. |
| 9,335,151 B2 | 5/2016 | Budiarto et al. |
| 2004/0130322 A1 | 7/2004 | Crouzen |

\* cited by examiner

THICKNESS MEASUREMENT USING A PULSED EDDY CURRENT SYSTEM

TECHNICAL FIELD

The present disclosure relates to non-contact measurement of a thickness of an object of an electrically conductive material by means of a Pulsed Eddy Current (PEC) system comprising a transmitter configured to generate a changing electromagnetic field which induces eddy currents in the object arranged within the electromagnetic field, and a receiver configured to detect a changing electromagnetic field generated by the eddy currents.

BACKGROUND

PEC, e.g. as described in U.S. Pat. No. 5,059,902, has been successfully applied to the measurement of mechanical quantities, such as electrical resistivity, thickness of non-ferrous metal sheets and edge position.

The method works by creating a static magnetic field in the plate under measurement using a DC current in a transmitter coil. The magnetic field is then suddenly removed by turning off the current, depositing the magnetic energy in suitable load resistors. The first pulse resulting from the current cut-off is measured and its integral can be used to determine the distance between the plate and the coil.

After the current in the transmitter coil has decayed, it is possible to start a measurement of the eddy currents induced in the plate by the sudden change of the applied magnetic field. The change of magnetic field due to the rapid decay of the eddy currents in the plate can induce a small signal which can be measured and analysed in order to deduce the resistivity and the thickness of the plate.

The earliest part of the eddy current decay is independent of the thickness, and can be used to get a measure of the resistivity of the plate. The later part depends on the sheet resistance, so it depends on the resistivity divided by the thickness. After computing the resistivity and the sheet resistance, the thickness of the plate can be deduced, e.g. as described in U.S. Pat. No. 6,661,224.

U.S. Pat. No. 7,701,205 discloses a PEC method of measurement of plate thickness where a transmitter coil is placed on one side of the plate and a receiver coil in placed on the other side of the plate.

A potential drawback with the techniques described in the documents mentioned above is that coil systems on both sides of the object, e.g. a plate, are required. Since the distance between the coil systems and the object in a PEC based measurement system for fundamental reasons has to be quite small (<20 mm), needing to physically fit the object in between the coil systems constrains the general applicability. One important example where above techniques are not usable is measurement of tube wall thickness, where it is normally not possible to have one of the coil systems within the tube. Another important example is measurement of thickness in the middle of a wide metal band (>1.5 m) during rolling, where it is practically impossible to keep the two coil systems at constant positions in relation to one another with a precision high enough to reach desired accuracy in the thickness measurement. The inability to use above-described techniques for these measurement applications has so far affect the general applicability of PEC technology for thickness and resistivity measurement in metal industries.

In U.S. Pat. No. 5,059,902, a general technique to determine resistivity and thickness of an object is described. This technique is possible to use to determine the thickness of an object, either for a general situation with different types of material and thicknesses with relatively lower accuracy, or with higher accuracy for a more limited range of materials and thicknesses. The reason for this is that to implement the method of U.S. Pat. No. 5,059,902 which gives three measured values for every set of position, resistivity and thickness where all relations between measured values and physical parameters are nonlinear, and unknown is unwieldy. In order to use the measured values to determine the three variables position, resistivity and thickness, test measurements with different test plates must be done to establish the relations and to describe them and later use them to determine physical parameters. As an example, if the thickness of an object can vary by a factor 10, for instance from 0.5 mm to 5 mm, the resistivity can vary a factor 10, for instance from 20 nΩm to 200 nΩm. If the desired accuracy of measurement of the physical parameters is 0.1%, which is a normal accuracy level in metal industry today, test measurements to establish the relation must be done for at least every 2% change of physical parameter value, this since the relation between the physical parameter and measurement is strongly nonlinear and unknown. The consequence of this is that around 14 000 tests with different values of the parameters resistivity and thickness has to be performed for this example, meaning that the same number of test objects, plates, must be produced and tested to supply enough information. For practical and economic reasons, it may be impossible to handle that large amount test objects. To create a working measurement method based on U.S. Pat. No. 5,059,902 it is necessary to either accept a lower accuracy, or using the method within a more constrained parameter region.

SUMMARY

It is an objective of the present invention to provide an improved way of determining a thickness of an object of an electrically conductive material by means of a Pulsed Eddy Current measurements.

According to an aspect of the present invention, there is provided a method of non-contact measurement of a thickness of an object of an electrically conductive material by means of a PEC system comprising a transmitter coil and a receiver coil. The method comprises, during a predetermined supply time period, supplying a constant current to the transmitter coil, said supplied current generating an electromagnetic field which penetrates the object. The method also comprises, after the supply time period, after a start time point $t_0$, turning off the supplied current, resulting in induced eddy currents in the object and a decaying magnetic field. The method also comprises, at the receiver coil, during a predetermined measurement time period starting at said start time point $t_0$, measuring a voltage induced by the decaying magnetic field. The voltage is converted to a magnetic flux by integration, and is measured at a first time point $t_1$, a second time point $t_2$ and at least one later time point $t_3$. The method also comprises calculating a total magnetic flux $\Phi_1$ which is generated by the eddy currents at the first time point $t_1$ and picked up by the receiver coil, by comparing the measured flux $\Phi_{plate}$ at the first time point $t_1$ with a predetermined total flux $\Phi_0$ picked up by the receiver coil when no object is present, wherein the first time point $t_1$ is set to the earliest time satisfying the provision that the magnetic flux $\Phi(t_1)$ at the first time point $t_1$ is zero when no object is present. The method also comprises normalizing measured magnetic flux $\Phi_{ec}$ resulting from the eddy currents and picked up by the receiver coil, using the calculated total magnetic flux $\hat{\Phi}_1$ as a normalization factor such that the normalized eddy current flux $\hat{\Phi}_{ec}$ is independent of a distance between the between the object and the transmitter and receiver coils whereby the normalized eddy current flux $\hat{\Phi}_{ec}$ is zero at the first time point $t_1$ and 1 at a time after the eddy currents have died out. The method also comprises relating the normalized eddy current flux $\hat{\Phi}_{ec}$ to normalized time $\tau$ using a time constant T as a normalization factor, such that $\tau=0$ when the real time $t=t_1$ and $\tau=1$ at a time after the turning off of the supplied current when the eddy currents have diffused to just reach a surface of the object facing away from the transmitter coil, whereby the normalized eddy current flux $\hat{\Phi}_{ec}$ is independent of the thickness within the normalized time interval from $\tau=0$ to $\tau=1$ and independent of the resistivity of the object at times above $\tau=1$. The method also comprises, based on the measurements at the first, second and later time points, determining the thickness and the resistivity of the object, wherein the second time point $t_2$ is set to within the normalized time interval from $\tau=0$ to $\tau=2$ and the at least one later time point $t_3$ is set such that $\tau>2$.

According to another aspect of the present invention, there is provided a computer program product comprising computer-executable components for causing a controller of an embodiment of a PEC system to perform the method of the present disclosure when the computer-executable components are run on processing circuitry comprised in the controller.

According to another aspect of the present invention, there is provided a PEC system for non-contact measurement of a thickness of an object of an electrically conductive material. The PEC system comprises a transmitter coil, a receiver coil, and a controller. The controller comprises processing circuitry and storage storing instructions executable by said processing circuitry whereby said controller is operative perform an embodiment of the method of the present disclosure.

In accordance with the present invention, by normalizing the magnetic flux and relating it to normalized time, the thickness and resistivity of the object can be unambiguously determined by PEC measurements at different time points.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
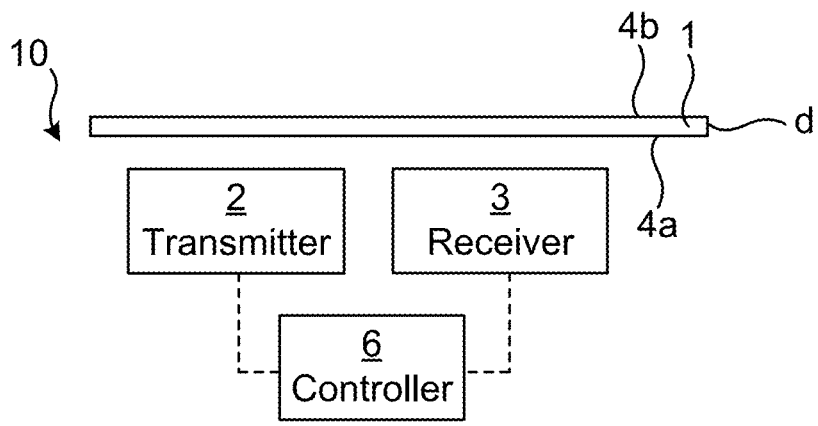
FIG. 1 is a schematic block diagram of a PEC system, in accordance with some embodiments of the present invention.

FIG. 1 illustrates an embodiment of a PEC system 10 arranged for measuring the thickness d of an object 1, typically a plate (which may also be called sheet metal or metal strip) of an electrically conductive material, typically a non-ferrous electrically conductive material such as Al, the object having a first (here lower) side 4a and a second (here upper) side 4b. In the figure, the object 1 in the form of a plate has a longitudinal axis which is perpendicular to the plane of the figure. Herein, the object 1 is exemplified as a plate, but the object may have other shapes in some embodiments.

The PEC system 10 comprises a transmitter coil 2 of a transmitter and a receiver coil 3 of a receiver. In the figure, both of the transmitter coil 2 and the receiver coil 3 are arranged on the same side of the object 1, which is preferred in some embodiments. However, in some other embodiments, the receiver coil 3 may be arranged on the opposite side of the object 1 in relation to the transmitter coil 2.

The transmitter coil 2 is configured to generate a sudden change of the supplied electromagnetic field which induces eddy currents in the object 1 arranged within the electromagnetic field, and the receiver coil 3 is configured for allowing an electrical voltage to be induced therein by the changing electromagnetic field generated e.g., first by the collapsing magnetic field when the current through the transmitter coil is turned off and then by the eddy currents.

The PEC system 10 may comprise a controller 6 for controlling the transmitter and the receiver via control signalling e.g., as illustrated by the dashed lines in the figure. The controller 6 may also be configured with circuitry for analysing the voltage induced in the receiver coil 3 by eddy currents in the object 1 in order to determine the thickness d of the object, as further described below. The controller may be formed as a separate device, or be partly or fully integrated with the transmitter and/or receiver. The controller 6 may e.g., comprise a central controller device which is arranged separate from the transmitter and receiver and distributed controller device(s) integrated with the transmitter and/or receiver.

Normalization of Eddy Currents

In order to be able to compute the thickness d and resistivity ρ from the measurement of the eddy currents, it is desirable to know the magnitude of these currents. The magnitude of the eddy currents generated in the plate 1 when the transmitter current $I_{Tr}$ is turned off, depends on the dimensions of the transmitter coil 2, the magnitude of the transmitter current $I_{Tr}$ and the distance D between the coil 2 and the plate 1. In order to measure the magnitude of the eddy currents in accordance with the invention, the total flux $\Phi_0$ generated by the transmitter current $I_{Tr}$ which is picked up by the receiver coil 3 is measured, as explained in the following.

Figure 2:
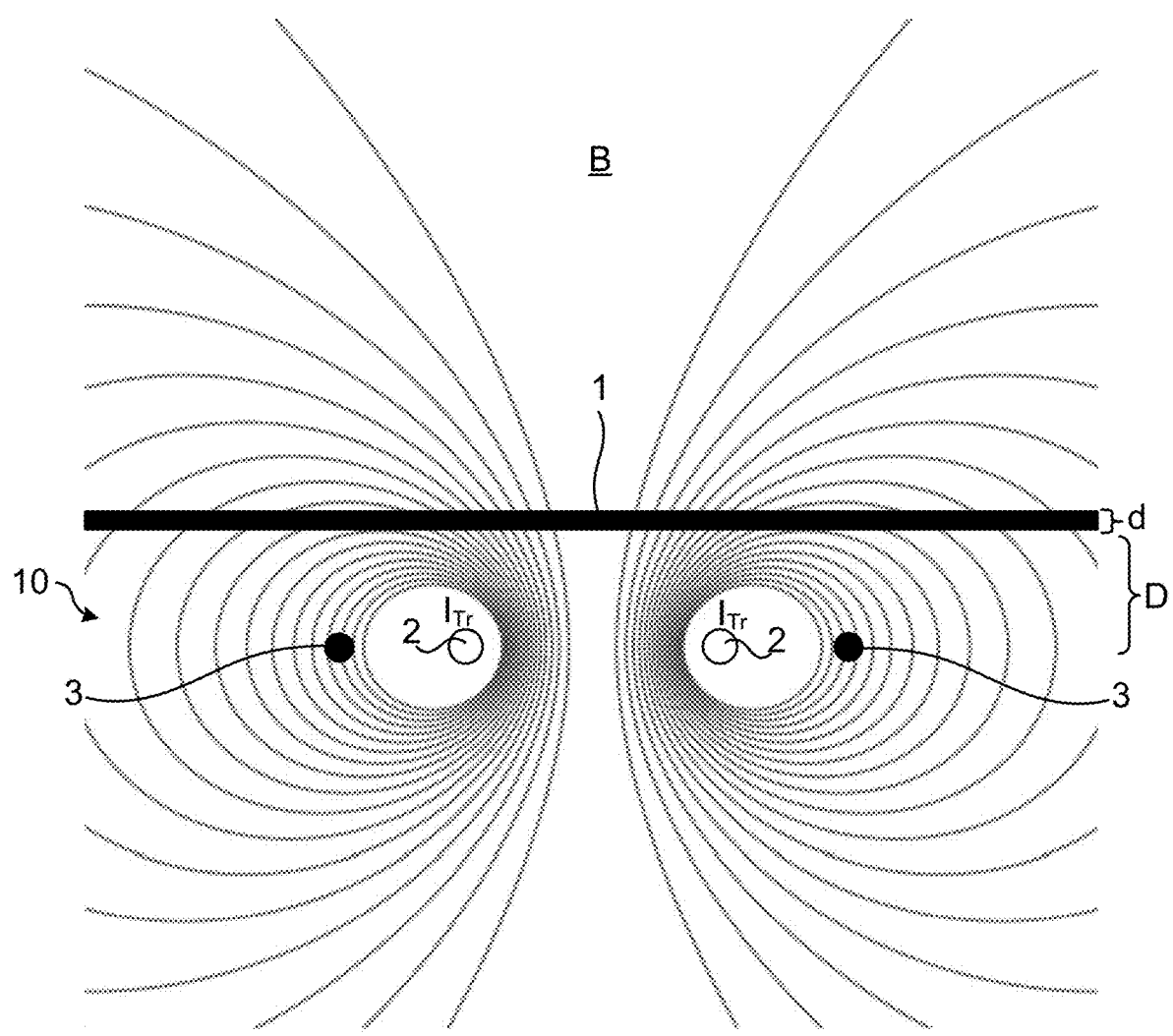
FIG. 2 illustrates the magnetic field generated by the constant transmitter current through the transmitter coil of a PEC system, after it has fully penetrated the plate, i.e. the influence of eddy currents has died out and the distribution of the field is independent of the presence of the plate, in accordance with some embodiments of the present invention.
Figure 3:
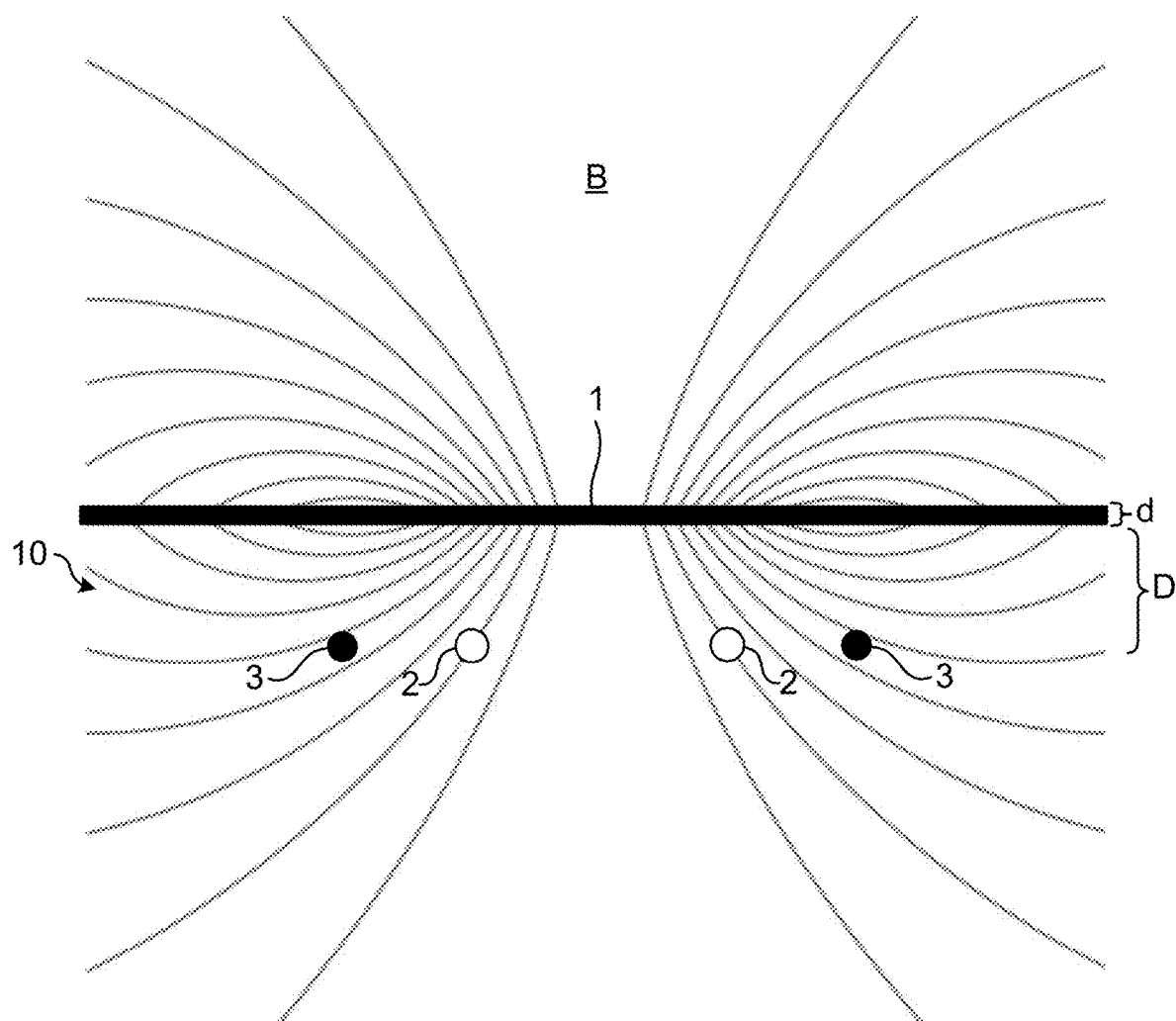
FIG. 3 illustrates the magnetic field generated by the eddy currents in the plate at the PEC system of FIG. 1 shortly after the transmitter current has been cut off, in accordance with some embodiments of the present invention.

FIG. 2 shows a cross section of the magnetic field B (B denotes the magnetic flux/field density which is commonly also called magnetic field) generated by the transmitter current $I_{Tr}$ flowing through the transmitter coil 2. The cross section of the transmitter coil is illustrated as the two inner (non-filled) dots, symbolizing where a turn of the coil passes perpendicular through the plane of the figure. The cross section of the receiver coil 3 is seen as the two outer (filled/black) dots. In the example of FIGS. 2 and 3, the transmitter coil 2 is thus positioned within the receiver coil 3, e.g. concentrically, but in other embodiments of the present invention, the transmitter and receiver coils may be otherwise positioned in relation to each other, e.g. side by side along an axis parallel to the plate 1. Preferably, both the transmitter coil and the receiver coil are positioned on the same side of the plate when in use. The field lines are in accordance with a circular transmitter coil 2 with a single turn, but either of the transmitter and receiver coils may have any suitable shape and/or any number of turns, depending on the application.

In the example of FIG. 2, the distribution of the magnetic field is shown as it is a sufficiently long time after the application of the constant (DC) transmitter current, when the possible influence of the eddy currents has died out. Then, the distribution of the field B is independent of the presence of the plate 1.

The total flux Φ picked up by each turn of the receiver coil 3 is by definition equal to the surface integral of the magnetic field density B over the surface S encircled by the turn of the receiver coil 3:

$$\Phi = \int_S \mathbb{B} \cdot \mathrm{d}S$$

The magnitude of the voltage V induced in each turn of the receiver coil 3 is obtained by Faraday's Law as the time derivative of the magnetic flux:

$$V(t) = -\frac{d\phi}{dt}$$

When no plate 1 is present, the magnetic field disappears fast as soon as the transmitter current has been cut off. By integrating the voltage induced in the receiver coil 3 from a time $t_0$ immediately prior to the current cut-off, until after the current has been successfully turned off at time $t_1$, where $\Phi(t_1)=0$ if no plate 1 is present, we obtain the total flux $\Phi_0$ picked up by the receiver coil 3, as defined by the surface integral (above), by:

$$\Phi_0 = \int_{t_0}^{t_1} V(t)\mathrm{d}t = -\int_{t_0}^{t_1} \frac{\mathrm{d}\phi}{\mathrm{d}t}\mathrm{d}t = -(\phi(t_1) - \phi(t_0)) = \phi(t_0)$$

As stated above, the first time point $t_1$ is set to when the magnetic flux $\Phi(t_1)$ is zero if no plate 1 is present. However, it should be noted that when the current in the transmitter coil is turned off, the current through the transmitter coil will decrease exponentially and not reach zero in a mathematical sense. That the magnetic flux $\Phi(t_1)$ is zero here thus implies that the flux is negligible, below a detection threshold or substantially zero.

In practice the transmitter current cannot be turned off instantaneously. The required time $t_1$ depends on the inductances of the PEC system 10, the capacitances and the value of any damping resistors. The time $t_1$ is thus a constant which depends on the design parameters of the system 10.

When a plate 1 is present, the eddy currents induced in the plate strive to maintain the magnetic field B in the plate that existed immediately before the transmitter current $I_{Tr}$ was cut off. In this case the magnetic field at time t1 becomes as shown in FIG. 3.

The magnetic field B in FIG. 3 above the plate 1 is the same as in FIG. 2. This field is mirrored to below the plate 1 by the symmetry of eddy currents in the plate. The field B in FIG. 3 is generated by the eddy currents alone, and is proportional to the magnitude of these.

The total flux $\Phi(t_1)$ when a plate 1 is present, generated by the eddy currents at time $t_1$, which is picked up by the receiver coil 3 is designated as $\Phi_1$. By again integrating the voltage V induced in the receiver coil 3 from time $t_0$ to $t_1$, but now in the presence of the plate 1, we get:

$$\Phi_{Plate} = \int_{t_0}^{t_1} V(t)\mathrm{d}t = -\int_{t_0}^{t_1} \frac{\mathrm{d}\phi}{\mathrm{d}t}\mathrm{d}t = -(\phi(t_1) - \phi(t_0)) = \Phi_0 - \Phi_1$$

From this relationship we can obtain $\Phi_1$, which will serve as a normalization factor to remove the dependence of the measurement on the distance D between the plate 1 and the coils 2 and 3 of the system 10.

$$\Phi_1 = \Phi_0 - \Phi_{Plate}$$

Normalization of Flux

In order to measure the time dependence of the eddy currents (ec), the integration is started at time $t_1$ and integrated for an additional time t:

$$\Phi_{ec}(t) = \int_{t_1}^{t-t_1} V(t)\mathrm{d}t = -\int_{t_1}^{t} \frac{\mathrm{d}\phi}{\mathrm{d}t}\mathrm{d}t = -(\phi(t-t_1) - \phi(t_1)) = \Phi_1 - \phi(t-t_1)$$

The quantity measured in this way is equal to zero for $t \to t_1$, and increases with time as the eddy currents and the magnetic flux are dissipated by the resistivity of the plate 1.

In order to eliminate the dependence on the distance D, we normalize this to the total flux $\Phi_1$ at the start of the measurement:

$$\hat{\Phi}_{ec}(t) = \phi_{ec}(t)/\phi_1 = 1 - \phi(t-t_1)/\phi_1 \qquad 5$$

This yields the normalized eddy current flux, which starts at zero (for $t=t_1$) and reaches unity (i.e. 1) after all the eddy currents have died out.

The time dependence of the PEC measurements will now be described in terms of this normalized eddy current flux $\hat{\Phi}_{ec}$.

At time $t_1$ the eddy currents are concentrated to the surface of the plate 1 which is closest to the transmitter coil 2 (the bottom surface 4a, see FIG. 1, in FIGS. 2 and 3). They are then dissipated and spread out due to the influence of the electrical resistivity $\rho$ of the plate. For early times, there is no influence from the thickness d of the plate, so the time dependence depends on the resistivity only. For later times, the time dependence is more complicated and depends on both the resistivity and the thickness.

Figure 4:
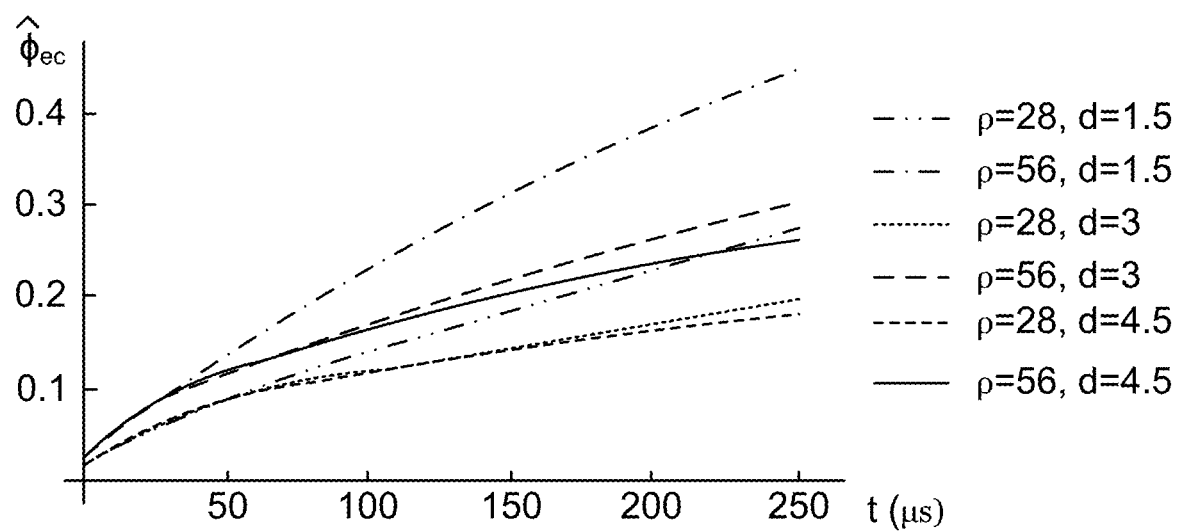
FIG. 4 is a graph showing normalized eddy current flux ($\hat{\Phi}_{ec}$) as a function of real time (t) for plates having different resistivities ($\rho$) and different thicknesses (d), in accordance with some embodiments of the present invention.

As an example, FIG. 4 describes the time dependence of the normalized eddy current flux $\hat{\Phi}_{ec}$ for six plates 1 of three different thicknesses d, 1.5, 3 and 4.5 mm, respectively, each of two different resistivities $\rho$, 28 and 56 n$\Omega$m, respectively.

As can be seen in FIG. 4, for times below 10 μs, where the origin is set at $t_1$, all curves corresponding to plates of the same resistivity coincide. During that time range, the measurement depends on the resistivity only. Then, at increasing times, the curves separate from each other.

Normalization of Time

When solving problems in mathematical physics, it is generally standard procedure to introduce normalized variables as a means to simplify the dependence on the different parameters involved. As we shall see, such a procedure applied to PEC technology will greatly reduce the number of test objects necessary to supply the information necessary to calibrate a model used to compute the thickness and resistivity from the measured samples.

In this case, the dissipation of the eddy currents generated by cutting off the transmitter current $I_{Tr}$ is described by a three-dimensional diffusion equation and time can be normalized to the characteristic time scale of the problem, namely $$T_{\rho,d} \equiv \frac{\mu_0 d^2}{\pi^2 \rho}$$

where T is the time constant corresponding to the rate of diffusion, d is the thickness of the plate, $\rho$ is the resistivity of the plate and $\mu_0$ is the magnetic permeability of vacuum. Before the thickness d and resistivity $\rho$ of the object 1 have been determined, the time constant T may be estimated/calculated based on a nominal thickness of the object 1, e.g. as given by a manufacturer of the object, and a resistivity estimated from PEC measurements on the object in an iterative manner. A first assumed value for $\rho$ gives an estimated value for T which results in the determination of a new $\rho$ which in its turn can be used for estimating a new T and so on until T can be calculated with desired precision.

The characteristic time scale describes the time it takes for the eddy currents to diffuse and reach the surface facing away from the transmitter coil 2 (i.e. the top surface 4b, see FIG. 1, in FIGS. 2 and 3). This is also the time after which the time dependence of the normalized eddy current flux $\hat{\Phi}_{ec}$ is influenced by the thickness d of the plate 1.

Figure 5:
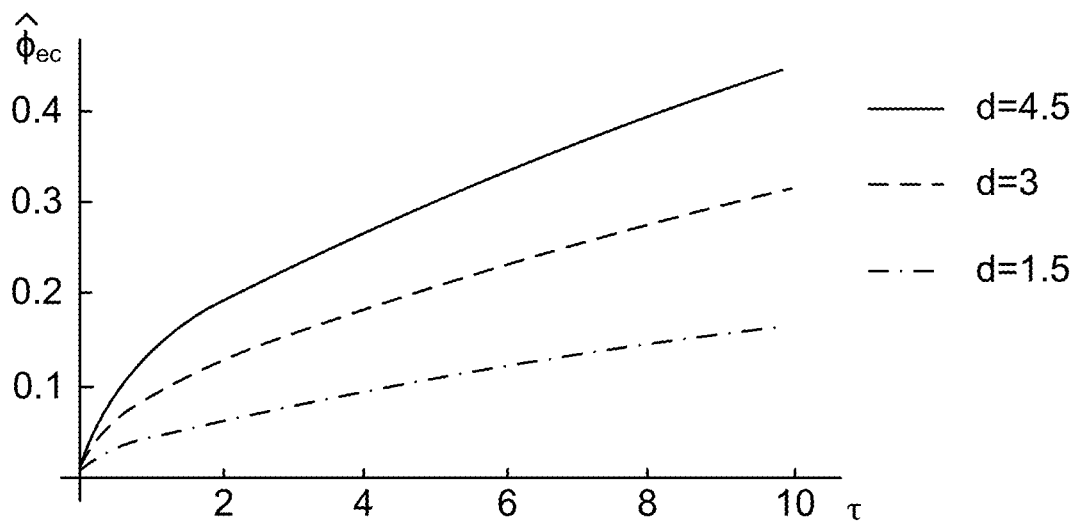
FIG. 5 is a graph showing, for the same plates as in FIG. 4, normalized eddy current flux ($\hat{\Phi}_{ec}$) as a function of normalized time ($\tau$), from $\tau=1$ to $\tau=10$, in accordance with some embodiments of the present invention.

If the normalized eddy current flux $\hat{\Phi}_{ec}$ is plotted against a normalized time $\tau$ we obtain a simpler relationship shown in FIG. 5, where $\tau$ is defined by:

$$\tau \equiv \frac{t}{T_{\rho,d}}$$

where t is real time after the transmitter current was completely turned off, i.e. $t_1$. It follows that the normalized time $\tau=0$ when the real time $t=t_1$. A value of $\tau$ of e.g., 2 implies that the real time t (typically in microseconds) corresponds to two-time constants T of the measured plate 1.

In FIG. 5, relating to the same six plates 1 as FIG. 4, the dependence on the resistivity $\rho$ is eliminated, and the measurement depends only on the thickness d. In this way we have greatly simplified the derivation of the resistivity and the thickness from the measurement of the normalized eddy current flux. This shows that the thickness d can be unambiguously determined e.g., with reference to a pre-prepared standard or calibration curve. For instance, old measurements on a plurality of objects (typically plates) having a known thickness and different resistivities may be input to a suitable Blackbox model, which is generally known in the art.

Expressed in terms of normalized times, a first measurement is performed at an early time $\tau_2$, when the normalized eddy current flux $\hat{\Phi}_{ec}(\tau_2)$ is only dependent on the resistivity of the plate. For this to be fulfilled, the normalized time $\tau_2$ should be less than, or on the order of unity (i.e. 1). In some embodiments of the present invention, the second time point $t_2$ is set to within the range of $\tau=0$ to $\tau=2$, preferably $\tau=0.8$ to $\tau=1$.

A second measurement is then performed at a later normalized time $\tau_3$, when the normalized eddy current flux $\hat{\Phi}_{ec}(\tau_3)$ is only dependent on the thickness of the plate. The value of this normalized time $\tau_3$ can be selected on the basis of other criteria which determine the performance of the system 10, such as the signal-to-noise ratio at the receiver coil 3. A value of at least 2 and/or less than 10 is appropriate for $\tau_3$. In some embodiments of the present invention, the third time point $t_3$ is set to within the normalized time interval from $\tau=3$ to $\tau=10$, preferably from $\tau=4$ to $\tau=7$.

In order to facilitate the computation of the thickness and resistivity from the measured signals, or to improve the signal-to-noise ratio, it may be appropriate to perform a plurality of measurements at respective later time points within this region of normalized time for the third time point, instead of just a single measurement at the third time point $t_3$. Thus, in some embodiments of the present invention, the measuring of a voltage induced by the decaying magnetic field at a (here, at least one) third time point $t_3$ includes at least two measurement(s) at respective later (third) time points, e.g. comprising or consisting of two measurements at a later time points, such as at a first later time point and a second later time point (the second later time point being different from the first later time point), typically both within the normalized time interval from $\tau=3$ to $\tau=10$, preferably from $\tau=4$ to $\tau=7$.

The thickness measurement of the object 1 may be repeated as often as possible in order to give dense samples of an object with a thickness which changes with the time. This would e.g., be the case when measuring the thickness of material produced in a rolling mill. The interval between thickness measurements should be sufficiently long to prevent any influence of eddy currents induced in the object in connection with the preceding thickness measurement(s) from disturbing the later thickness measurement(s).

Experience has shown that an appropriate trade-off between speed and accuracy is obtained if the supply time period is so long that the normalized eddy current flux $\hat{\Phi}_{ec}$ will have reached about two thirds when the current is turned off.

The timescale for this process may be determined by the so-called sheet resistivity of the object 1, typically a plate. The sheet resistivity is defined as the resistivity of the object divided by its thickness. An appropriate supply time in microseconds can then be computed as the plate thickness, typically the nominal thickness of the object 1, in μm divided by the resistivity in nΩm and multiplied by seventeen.

In order to determine the characteristic time scale, a knowledge of the resistivity ρ and thickness d of the plate to be measured may be convenient. Normally, the nominal thickness of the plate is known, and the resistivity may be obtained from the measurement, whereby the correct time scale may be obtained in an iterative manner. The thickness measurement is still possible if the thickness is not known beforehand, through iteration.

Figure 6:
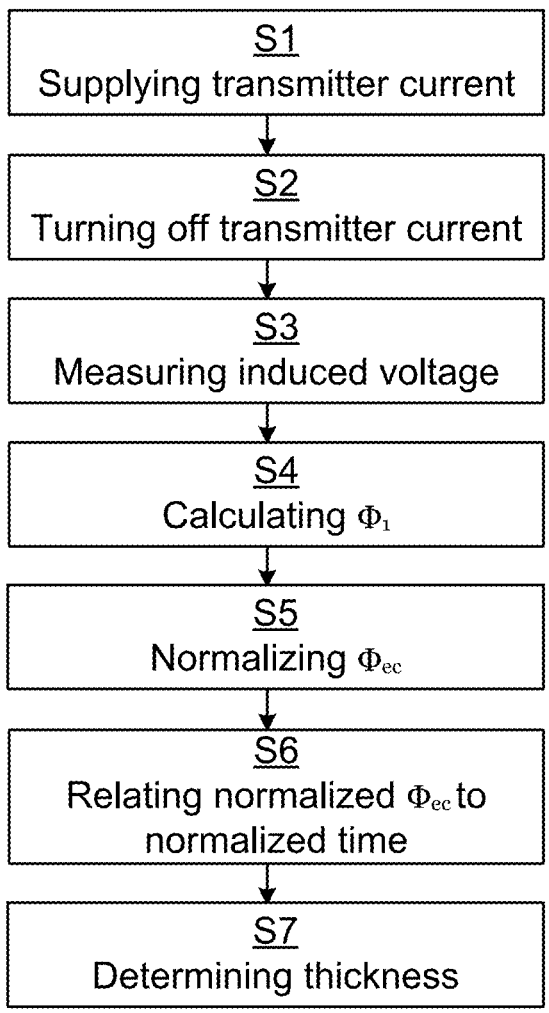
FIG. 6 is a schematic flow chart of some embodiments of the method of the present invention.

FIG. 6 is a flow chart illustrating some embodiments of the method of the invention. The method is for non-contact measurement of the thickness d of an object 1 of an electrically conductive material by means of a PEC system 10 comprising a transmitter coil 2 and a receiver coil 3. The method comprises, during a predetermined supply time period, supplying S1 a constant current to the transmitter coil 2, said supplied current generating an electromagnetic field B which penetrates the object 1. The method also comprises, after the supply time period, after a start time point $t_0$, turning off S2 the supplied current, resulting in induced eddy currents in the object and a decaying magnetic field B. The method also comprises, at the receiver coil 3, during a predetermined measurement time period starting at said start time point $t_0$, measuring S3 a voltage induced by the decaying magnetic field at a first time point $t_1$, a second time point $t_2$ and at least one later or third time point $t_3$. The method also comprises calculating S4 a total magnetic flux $\Phi_1$ which is generated by the eddy currents at the first time point $t_1$ and picked up by the receiver coil 3, by comparing the measured flux $\Phi_{plate}$ at the first time point $t_1$ with a predetermined total flux $\Phi_0$ picked up by the receiver coil when no object 1 was present, wherein the first time point $t_1$ is set to the earliest time satisfying the provision that the magnetic flux $\Phi(t_1)$ at the first time point $t_1$ is zero when no object is present. The method also comprises normalizing S5 measured magnetic flux $\Phi_{ec}$ resulting from the eddy currents and picked up by the receiver coil 3, using the calculated S4 total magnetic flux $\Phi_1$ as a normalization factor such that the normalized eddy current flux $\hat{\Phi}_{ec}$ is independent of a distance D between the object 1 and the transmitter and receiver coils whereby the normalized eddy current flux $\hat{\Phi}_{ec}$ is zero at the first time point $t_1$ and 1 at a time after the eddy currents have died out. The method also comprises relating S6 the normalized eddy current flux $\hat{\Phi}_{ec}$ to normalized time τ using a time constant T as a normalization factor, such that τ=0 when the real time t=$t_1$ and τ=1 at a time after the turning off of the supplied current when the eddy currents have diffused to just reach a surface 4b of the object 1 facing away from the transmitter coil 2, whereby the normalized eddy current flux $\hat{\Phi}_{ec}$ is independent of the thickness d within the normalized time interval from τ=0 to τ=1 and independent of the resistivity ρ of the object 1 at times above τ=1. The method also comprises, based on the measurements at the first, second and later time points, determining S7 the thickness d and the resistivity ρ of the object 1, wherein the second time point $t_2$ is set to within the normalized time interval from τ=0 to τ=2 and the at least one later time point $t_3$ is set such that τ>2.

Figure 7:
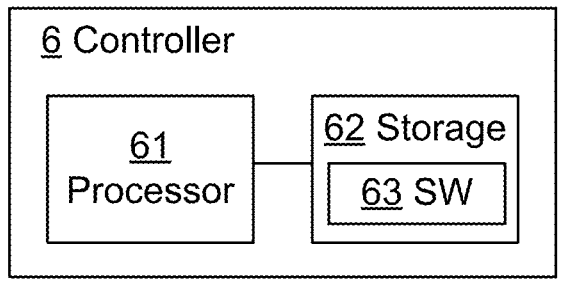
FIG. 7 is a is a schematic block diagram of a controller of the PEC system, in accordance with some embodiments of the present invention.

FIG. 7 schematically illustrates an embodiment of the controller 6 of the present disclosure. The controller 6 comprises processing circuitry 61 e.g., a central processing unit (CPU). The processing circuitry 61 may comprise one or a plurality of processing units in the form of microprocessor(s). However, other suitable devices with computing capabilities could be comprised in the processing circuitry 61, e.g. an application specific integrated circuit (ASIC), a field programmable gate array (FPGA) or a complex programmable logic device (CPLD). The processing circuitry 61 is configured to run one or several computer program(s) or software (SW) 63 stored in a storage 62 of one or several storage unit(s) e.g., a memory. The storage unit is regarded as a computer readable means, forming a computer program product 62 together with the SW 63 stored thereon as computer-executable components, as discussed herein and may e.g., be in the form of a Random-Access Memory (RAM), a Flash memory or other solid-state memory, or a hard disk, or be a combination thereof. The processing circuitry 61 may also be configured to store data in the storage 62, as needed. The controller 6 may be configured to perform the method of the present disclosure.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of non-contact measurement of a thickness (d) of an object of an electrically conductive material by means of a Pulsed Eddy Current, PEC, system comprising a transmitter coil and a receiver coil, the method comprising:
    during a predetermined supply time period, supplying a constant current to the transmitter coil, said supplied constant current generating an electromagnetic field (B) which penetrates the object;
    after the predetermined supply time period, after a start time point ($t_0$), turning off the supplied constant current, resulting in induced eddy currents in the object and a decaying magnetic field (B);
    at the receiver coil, during a predetermined measurement time period starting at said start time point ($t_0$), measuring a voltage induced by the decaying magnetic field at a first time point (t), a second time point ($t_2$) and at least one later time point ($t_3$);
    calculating a total magnetic flux ($\Phi_1$) which is generated by the induced eddy currents at the first time point ($t_1$) and picked up by the receiver coil, by comparing a measured flux ($\Phi_{plate}$) at the first time point ($t_1$) with a predetermined total flux ($\Phi_0$) picked up by the receiver coil when no object is present, wherein the first time point ($t_1$) is set to the earliest time satisfying a provision that the magnetic flux ($\Phi(t_1)$) at the first time point ($t_1$) is zero when no object is present, wherein $\Phi_1$ is calculated as $\Phi_0 - \Phi_{plate}$;
    normalizing a measured magnetic flux (($\Phi_{ec}$) resulting from the induced eddy currents and picked up by the receiver coil, using the calculated total magnetic flux ($\Phi_1$) as a normalization factor such that a normalized eddy current flux ($\hat{\Phi}_{ec}$) is independent of a distance (D)

between the object and the transmitter and receiver coils whereby the normalized eddy current flux ($\hat{\Phi}_{ec}$) is zero at the first time point ($t_1$) and 1 at a time after the induced eddy currents have died out;

relating the normalized eddy current flux ($\hat{\Phi}_{ec}$) to a normalized time (T) using a time constant (T) as a normalization factor, such that τ=0 when a real time t=$t_1$ and τ=1 at a time after the turning off of the supplied constant current when the eddy currents have diffused to just reach a surface of the object facing away from the transmitter coil, whereby the normalized eddy current flux ($\hat{\Phi}_{ec}$) is independent of the thickness (d) within a normalized time interval from τ=0 to τ=1 and independent of a resistivity (ρ) of the object at times above τ=1, wherein the time constant (T) is calculated as:

$$T_{\rho,d} \equiv \frac{\mu_0 d^2}{\pi^2 \rho}$$

wherein d is the thickness of the object, as previously estimated, ρ is the resistivity of the object, as previously estimated, and $\mu_0$ is a magnetic permeability of vacuum; and based on the measurements at the first time point, the second time point and the at least one later time point, determining the thickness (d) and the resistivity (ρ) of the object, wherein the second time point ($t_2$) is set to within the normalized time interval from τ=0 to τ=2, where the normalized eddy current flux $\hat{\Phi}_{ec}(\tau_2)$ is only dependent on the resistivity of the object, and the at least one later time point ($t_3$) is set such that τ>2, where the normalized eddy current flux $\hat{\Phi}_{ec}(\tau_3)$ is only dependent on the thickness of the object.

2. The method of claim 1, wherein the second time point ($t_2$) is set to within the range of τ=0.8 to τ=1.

3. The method of claim 1, wherein the at least one later time point ($t_3$) is set to within the normalized time interval from τ=3 to τ=10.

4. The method of claim 1, wherein the object is a plate.

5. The method of claim 1, wherein the at least one later time point ($t_3$). comprises a first later time point and a second later time point.

6. A computer program product comprising a non-transitory computer readable storage medium storing computer-executable components, wherein the computer executable components when run on processing circuitry of a controller of a Pulsed Eddy Current, PEC, system causes the controller to perform a method of non-contact measurement of a thickness (d) of an object of an electrically conductive material, the method including:

during a predetermined supply time period, supplying a constant current to a transmitter coil of the PEC system, said supplied constant current generating an electromagnetic field which penetrates the object;

after the predetermined supply time period, after a start time point ($t_0$), turning off the supplied constant current, resulting in induced eddy currents in the object and a decaying magnetic field;

at a receiver coil of the PEC system, during a predetermined measurement time period starting at said start time point ($t_0$), measuring a voltage induced by the decaying magnetic field at a first time point ($t_1$), a second time point ($t_2$) and at least one later time point ($t_3$);

calculating a total magnetic flux ($\Phi_1$) which is generated by the induced eddy currents at the first time point ($t_1$) and picked up by the receiver coil, by comparing a measured flux ($\Phi_{plate}$) at the first time point ($t_1$) with a predetermined total flux ($\Phi_0$) picked up by the receiver coil when no object is present, wherein the first time point ($t_1$) is set to the earliest time satisfying a provision that the magnetic flux ($\Phi(t_1)$) at the first time point ($t_1$) is zero when no object is present, wherein $\Phi_1$ is calculated as $\Phi_0 - \Phi_{plate}$;

normalizing a measured magnetic flux (($\Phi_{ec}$) resulting from the induced eddy currents and picked up by the receiver coil, using the calculated total magnetic flux ($\Phi_1$) as a normalization factor such that a normalized eddy current flux ($\hat{\Phi}_{ec}$) is independent of a distance between the object and the transmitter and receiver coils whereby the normalized eddy current flux ($\hat{\Phi}_{ec}$) is zero at the first time point ($t_1$) and 1 at a time after the induced eddy currents have died out;

relating the normalized eddy current flux ($\hat{\Phi}_{ec}$) to a normalized time (τ) using a time constant (T) as a normalization factor, such that T=0 when a real time t=$t_1$ and τ=1 at a time after the turning off of the supplied constant current when the eddy currents have diffused to just reach a surface of the object facing away from the transmitter coil, whereby the normalized eddy current flux ($\hat{\Phi}_{ec}$) is independent of the thickness (d) within a normalized time interval from τ=0 to τ=1 and independent of a resistivity (ρ) of the object at times above τ=1, wherein the time constant (T) is calculated as:

$$T_{\rho,d} \equiv \frac{\mu_0 d^2}{\pi^2 \rho}$$

wherein d is the thickness of the object, as previously estimated, ρ is the resistivity of the object, as previously estimated, and $\mu_0$ is a magnetic permeability of vacuum; and based on the measurements at the first time point, the second time point and the at least one later time point, determining the thickness (d) and the resistivity (ρ) of the object, wherein the second time point ($t_2$) is set to within the normalized time interval from τ=0 to τ=2, where the normalized eddy current flux $\hat{\Phi}_{ec}(\tau_2)$ is only dependent on the resistivity of the object, and the at least one later time point ($t_3$) is set such that τ>2, where the normalized eddy current flux $\hat{\Phi}_{ec}(\tau_3)$ is only dependent on the thickness of the object.

7. A PEC system for non-contact measurement of a thickness (d) of an object of an electrically conductive material, the PEC system including a transmitter coil, a receiver coil, and a controller comprising:

processing circuitry; and storage storing instructions executable by said processing circuitry whereby said controller is operative to:

during a predetermined supply time period, supply a constant current to the transmitter coil, said supplied constant current generating an electromagnetic field (B) which penetrates the object;

after the predetermined supply time period, after a start time point ($t_0$), turn off the supplied constant current, resulting in induced eddy currents in the object and a decaying magnetic field (B);

at the receiver coil, during a predetermined measurement time period starting at said start time point ($t_0$), measure a voltage induced by the decaying magnetic field at a first time point ($t_1$), a second time point ($t_2$) and at least one third time point ($t_3$);

calculate a total magnetic flux ($\Phi_1$) which is generated by the induced eddy currents at the first time point ($t_1$) and picked up by the receiver coil, by comparing a measured flux ($\Phi_{plate}$) at the first time point ($t_1$) with a predetermined total flux ($\Phi_0$) picked up by the receiver coil when no object is present, wherein the first time point ($t_1$) is set to the earliest time satisfying a provision that the magnetic flux ($\Phi(t_1)$) at the first time point ($t_1$) is zero when no object is present, wherein $\Phi_1$ is calculated as $\Phi_0 - \Phi_{plate}$;

normalize a measured magnetic flux ($\Phi_{ec}$) resulting from the induced eddy currents and picked up by the receiver coil, using the calculated total magnetic flux ($\Phi_1$) as a normalization factor such that a normalized eddy current flux ($\hat{\Phi}_{ec}$) is independent of a distance (D) between the object and the transmitter and receiver coils whereby the normalized eddy current flux ($\Phi_{ec}$) is zero at the first time point (t) and 1 at a time after the induced eddy currents have died out;

relate the normalized eddy current flux ($\hat{\Phi}_{ec}$) to a normalized time ($\tau$) using a time constant (T) as a normalization factor, such that $\tau=0$ when a real time $t=t_1$ and $\tau=1$ at a time after the turning off of the supplied constant current when the eddy currents have diffused to just reach a surface of the object facing away from the transmitter coil, whereby the normalized eddy current flux ($\hat{\Phi}_{ec}$) is independent of the thickness (d) within a normalized time interval from $\tau=0$ to $\tau=1$ and independent of a resistivity ($\rho$) of the object at times above $\tau=1$, wherein the time constant (T) is calculated as:

$$T_{\rho,d} \equiv \frac{\mu_0 d^2}{\pi^2 \rho}$$

wherein d is the thickness of the object, as previously estimated, $\rho$ is the resistivity of the object, as previously estimated, and $\mu_0$ is a magnetic permeability of vacuum; and based on the measurements at the first time point, the second time point and the at least one third time point, determine the thickness (d) and the resistivity ($\rho$) of the object, wherein the second time point ($t_2$) is set to within the normalized time interval from $\tau=0$ to $\tau=2$, where the normalized eddy current flux $\hat{\Phi}_{ec}(\tau_2)$ is only dependent on the resistivity of the object, and the at least one third time point ($t_3$) is set such that $\tau>2$, where the normalized eddy current flux $\hat{\Phi}_{ec}(\tau_3)$ is only dependent on the thickness of the object.

* * * * *